United States Patent [19]

Jun

[11] Patent Number: 5,049,839
[45] Date of Patent: Sep. 17, 1991

[54] BIPHASE MODULATON CIRCUIT HAVING CONTINUOUS PHASE CHANGES

[75] Inventor: Soon-Ik Jun, Suwon, Rep. of Korea

[73] Assignee: SamSung Electronics Co., Ltd., Suwon, Rep. of Korea

[21] Appl. No.: 589,620

[22] Filed: Sep. 28, 1990

[30] Foreign Application Priority Data

Oct. 4, 1989 [KR] Rep. of Korea ............... 1989-14205

[51] Int. Cl.$^5$ ......................................... H04L 27/20
[52] U.S. Cl. ..................................... 332/103; 375/55; 375/67
[58] Field of Search ....................... 332/103, 104, 105; 375/55, 67

[56] References Cited

U.S. PATENT DOCUMENTS 3,973,201 8/1976 Andren ..................... 332/105 X

Primary Examiner—Siegfried H. Grimm
Attorney, Agent, or Firm—Robert E. Bushnell

[57] ABSTRACT

A BPSK modulation circuit for a digital communication transmitter comprising a data generator for generating data, a timing circuit for delaying the data produced from the data generator by timing the data in synchronism with a given pulse, a logic circuit for generating a timing pulse whenever the data from the data generator is inverted, a local oscillator for generating a local oscillating frequency, a phase shifter for shifting the local oscillating frequency to have a phase difference of 90°, a first double balanced mixer for modulating the delayed signal of the timing circuit in synchronism with the 90° phase-shifted signal of the phase shifter, a second double balanced mixer for modulating the timing pulse of the logic circuit in synchronism with the local oscillating frequency of the local oscillator, and a signal mixer (synthesizing circuit) for synthesizing the output signals of the first and second balanced mixers.

2 Claims, 6 Drawing Sheets

BIPHASE MODULATON CIRCUIT HAVING CONTINUOUS PHASE CHANGES

BACKGROUND OF THE INVENTION

The present invention relates to an automatic vehicle location system for use in data communication, and more particulary, in a data communication system using a biphase shift keying (hereinafter, referred to as "BPSK"), to a BPSK modulation circuit supplying a higher output power with band limitation.

Referring to FIGS. 1A and 1B, in a known BPSK modulation system, data from a data generator 10, as shown by a waveform A, and a carrier wave from a local oscillator 12, as shown by a waveform B, are mixed together at a mixer 14 to produce a modulation signal for transmission.

Such signal can not have a wide transmission bandwidth because the frequency band is allotted to many other data transmissions. In order to improve such a drawback, a BPSK modulation method to limit the bandwidth of a transmission signal as shown by a waveform A of FIG. 2B is to filter data produced from the data generator 10 through a waveform shaping filter 11 to obtain the waveform B of the data as shown in FIG. 2B. The output of the waveform shaping filter 11 and a carrier wave produced from the local oscillator 12, as shown by a waveform C of FIG. 2B are mixed together through the mixer 14 to produce a signal D modulated as shown in FIG. 2B. Though this modulated signal has a limited bandwith according to the waveform shaping characteristics, there occur damped amplitude portions. Hence, in order to transmit the modulated signal, it must be highly increased in output power. Furthermore, when the modulated signal passes a power amplifier, the damped amplitude portions are not amplified because they are below the minimum input power, so that the waveform is distorted and does not accurately transmit the data.

SUMMARY OF THE INVENTION

It is therefore an object of the present invention to provide a BPSK modulation circuit capable of achieving a higher transmission power and band limitation upon transmission, whereby a phase difference in such a BPSK modulation of a digital transmit data is changed in a short time interval by a continuous phase shift.

According to the present invention, a BPSK modulation circuit for a digital communication transmitter comprises a data generator, a timing circuit, a logic circuit, a phase shifter, a first double balanced mixer and a second double balanced mixer. The data generator generates data being supplied to the timing circuit and the logic circuit. The timing circuit delays the data from the data generator by timing the data in synchronism with a given pulse. The logic circuit generates a timing pulse whenever a logic level of the data of the data generator is inverted. A local oscillator generates a local oscillating frequency signal. A phase shifter shifts the local oscillating frequency signal with a phase difference of 90°. A first double balanced mixer mixes the delayed signal from the timing circuit and the output from the phase shifter. A second double balanced mixer mixes the timing pulse from the logic circuit and the local oscillating frequency from the local oscillator. A signal mixer (synthesizing circuit) synthesizes the output signals of the first and second balanced mixers.

The present invention will now be described with reference to the drawings attached only by way of example.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE PREFERRED EMBODIMENT

Figure 1A:
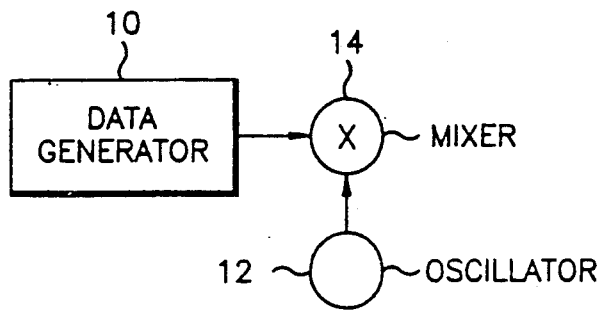
FIG. 1A shows a circuit diagram of a BPSK modulation method.
Figure 1B:
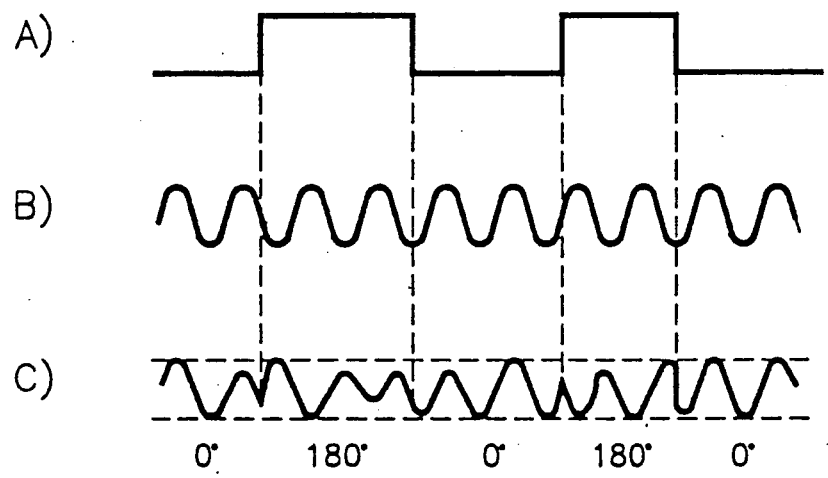
FIG. 1B shows the operational waveforms of the parts of FIG. 1A.
Figure 2A:
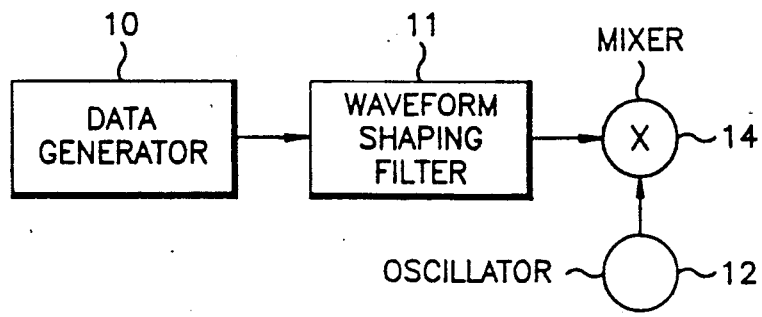
FIG. 2A shows a circuit diagram of a BPSK modulation method wherein the frequency band is limited.
Figure 2B:
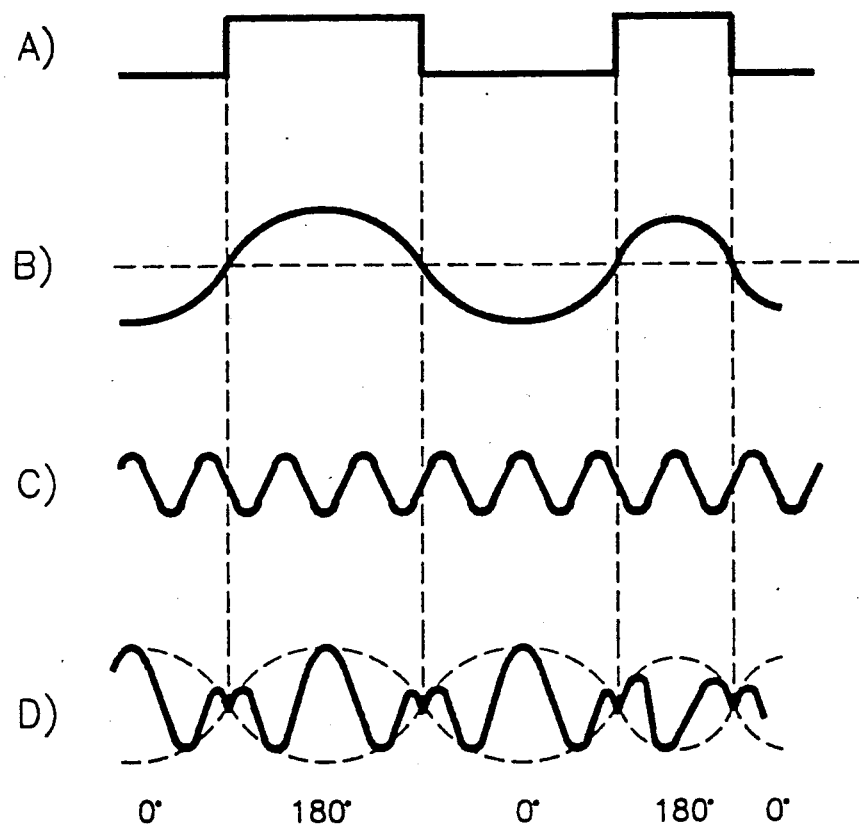
FIG. 2B shows the operational waveforms of the parts of FIG. 2A.
Figure 3A:
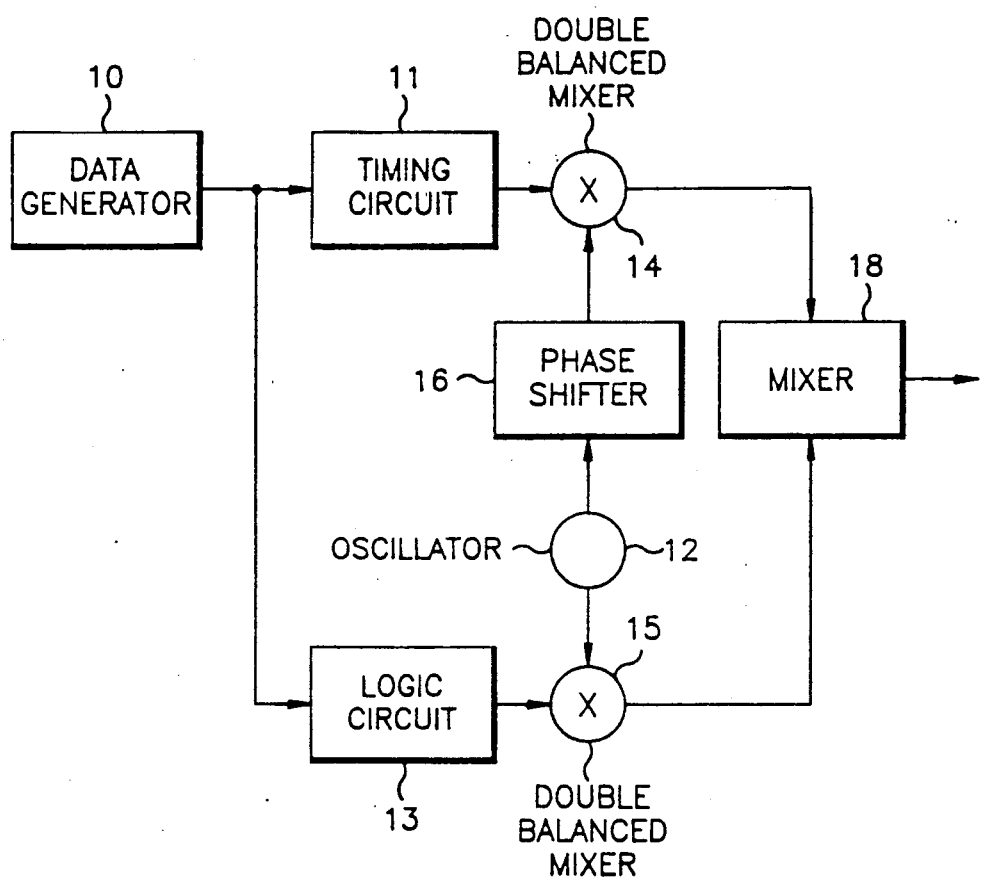
FIG. 3A shows a circuit diagram of the modulation method of the present invention.

Referring to FIG. 3A, a data generator 10 generates data being supplied to a timing circuit 11 and a logic circuit 13. The timing circuit 11 delays the data from the data generator by timing the data in synchronism with a given pulse. The logic circuit 13 generates a timing pulse whenever a logic level of the data from the data generator is inverted. A local oscillator 12 generates a local oscillating frequency signal. A phase shifter 16 shifts the local oscillating frequency signal with a phase difference of 90°. A first double balanced mixer 14 mixes the delayed signal from the timing circuit 11 and the output from the phase shifter 16. A second double balanced mixer 15 mixes the timing pulse from the logic circuit 13 and the local oscillating frequency from the local oscillator 12. A signal mixer 18 synthesizes the output signals of the first and second balanced mixers.

Figure 3B:
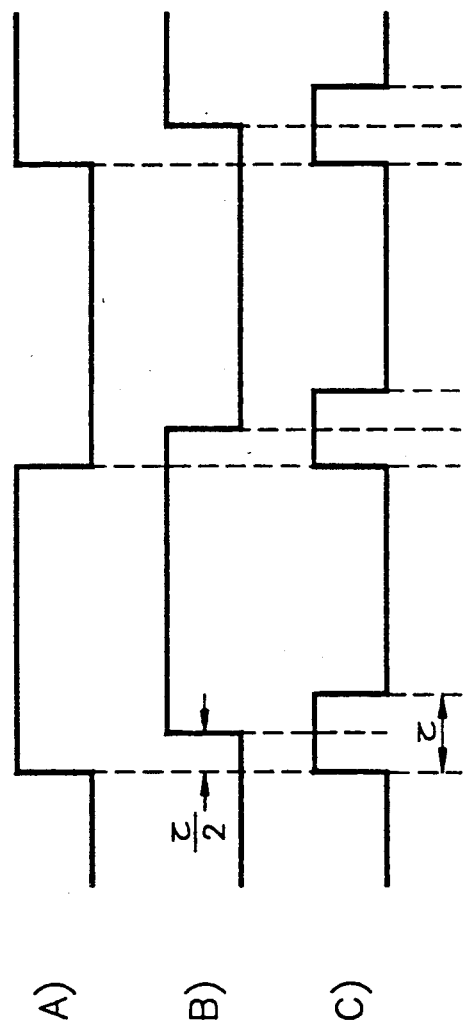
FIGS. 3B and 3C show the operational waveforms of the parts of FIG. 3A.

The data from the data generator 10, as shown by a waveform A of FIG. 3B, is transmitted to the timing circuit 11 and the logic circuit 13. The timing circuit 11 delays the data from the data generator 10, by $\tau/2$, and outputs the delayed signal, as shown by a waveform B of FIG. 3B. The logic circuit 13 produces a pulse having the duration of $\tau$ whenever the data is inverted from 0 to 1 or vice versa. The local oscillator 12 supplies a local oscillating frequency to the phase shifter 16 and second double balanced mixer 15. The phase shifter 16 causes a signal to have a phase difference of 90° with reference to another signal so as to produce a signal as shown by a waveform A of FIG. 3C, for example, if a signal is $\sin \omega t$, the another signal is caused to be $\cos \omega t$.

Figure 3C:
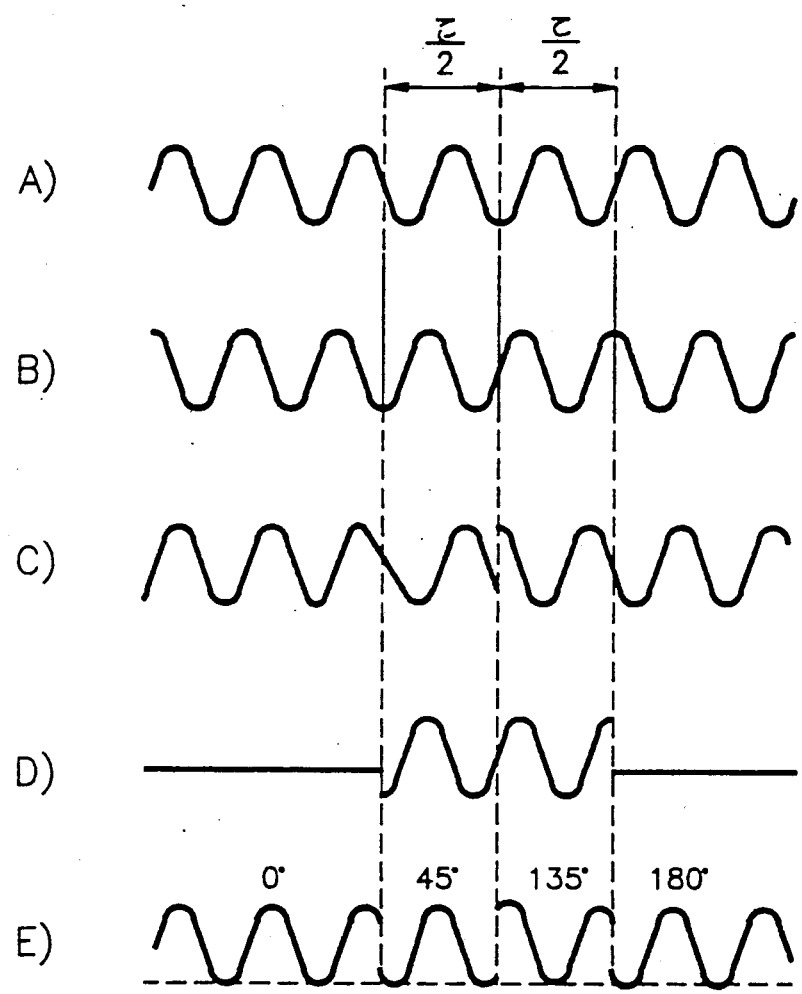
Figure 4A:
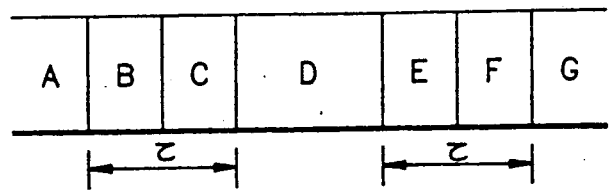
FIGS. 4A, 4B and 4C show phase diagrams of mixer 18 of FIG. 3A.
Figure 4B:
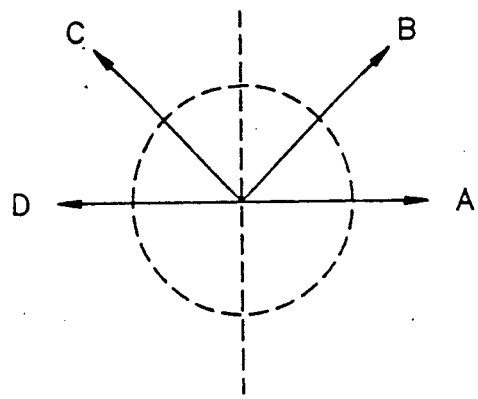
Figure 4C:
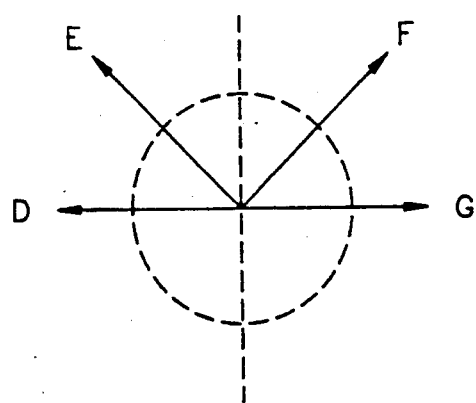

The signal as shown by a waveform A of FIG. 3C, produced by the phase shifter 16, and the signal as shown by a waveform B of FIG. 3B, produced by the timing circuit 11 are applied to the first double balanced mixer 1 to modulate the data delayed by $\tau/2$ into a 90° phase-shifted signal so as to produce a signal as shown by a waveform C of FIG. 3C. The second double balanced mixer 15 modulates a signal as shown by a waveform C of FIG. 3B, produced by the logic circuit 13 in synchronism with a local oscillating frequency signal as shown by a waveform B of FIG. 3C produced by oscillator 12, so as to produce a signal as shown by a waveform D of FIG. 3C. The output signals of the first and second double balanced mixer 14 and 15 are mixed together through the signal mixer 18 to produce a signal as shown by a waveform E of FIG. 3C. In this case, considering the phase interval before the two signals synthesizing with respect to ABCDEFG in FIG. 4A, the phase retains the vlaue of 0 at A, as shown in FIG. 4B, then changed to 45° and 135° respectively at B and C in the period of $\tau$, finally retaining the value of 180° at D. Successively, the phase is again changed through 135° to 45° during the interval EF finally to 0° at G in the duration of $\tau$.

Consequently, the present invention is to provide a BPSK modulation circuit capable of achieving a higher transmission power and band limitation upon transmission, whereby a phase difference in such a BPSK modulation of a digital transmit data is changed in a short time interval by a continuous phase shift.

While the invention has been particularly shown and described with reference to a preferred embodiment, it will be understood by those skilled in the art that modifications in detail may be made without departing from the spirit and scope of the invention.

What is claimed is:

1. A biphase shift keying modulation circuit for a digital communication transmitter, particulary adaptable to an automatic vehicle location system, comprising:

a data generator for generating data for transmission in the transmitter;

a timing circuit, coupled to said data generator, for delaying the data of said data generator by timing said data in synchronism with a given pulse;

a logic circuit, coupled to said data generator, for generating a timing pulse whenever a logic level of the data of said data generator is inverted;

a local oscillator for generating a local oscillating frequency signal;

a phase shifter, coupled to said local oscillator, for shifting said local oscillating frequency signal with a phase difference of 90°;

a first mixer, coupled to said timing circuit and said phase shifter, for modulating the delayed signal of said timing circuit in synchronism with the 90° phase-shifted signal of said phase shifter;

a second mixer, coupled to said logic circuit and said local oscillator, for modulating the timing pulse of said logic circuit in synchronism with the local oscillating frequency signal of said local oscillator; and a signal mixer, coupled between said first and second mixers, for synthesizing the output signals of said first and second mixers.

2. A biphase shift keying modulation circuit as claimed in 1, wherein said first and second mixers are double balanced mixers.

* * * * *

UNITED STATES PATENT AND TRADEMARK OFFICE
CERTIFICATE OF CORRECTION

PATENT NO. : 5,049,839
DATED : 17 September 1991
INVENTOR(S) : Soon-Ik Jun

It is certified that error appears in the above-indentified patent and that said Letters Patent is hereby corrected as shown below:

On the title page, item

[54]    TITLE OF THE INVENTION  and Column 1, line 1,

Change "MODULATON" to --MODULATION--:

Column 1    Line 19,    after "such", insert --a transmission-- ;

Column 2    Line 62,    after "mixer", change "1" to --14-- :

Signed and Sealed this

Thirty-first Day of October 1995

Attest:

BRUCE LEHMAN

*Attesting Officer*    *Commissioner of Patents and Trademarks*